US012001692B2

(12) United States Patent
Aritsuka et al.

(10) Patent No.: US 12,001,692 B2
(45) Date of Patent: Jun. 4, 2024

(54) ACCESS CONTROL SYSTEM AND ACCESS CONTROL METHOD

(71) Applicant: Hitachi, Ltd., Tokyo (JP)

(72) Inventors: Toshiyuki Aritsuka, Tokyo (JP); Takahiro Yamamoto, Tokyo (JP); Tatsuya Hirai, Tokyo (JP); Hideo Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 77 days.

(21) Appl. No.: 17/945,766

(22) Filed: Sep. 15, 2022

(65) Prior Publication Data

US 2023/0259288 A1    Aug. 17, 2023

(30) Foreign Application Priority Data

Feb. 15, 2022   (JP) .................. 2022-021028

(51) Int. Cl.
*G06F 3/06* (2006.01)
(52) U.S. Cl.
CPC .......... *G06F 3/0622* (2013.01); *G06F 3/0655* (2013.01); *G06F 3/0673* (2013.01)

(58) Field of Classification Search
None
See application file for complete search history.

(56) References Cited

U.S. PATENT DOCUMENTS

| 6,336,186 | B1 * | 1/2002 | Dyksterhouse ....... G06F 21/602 713/168 |
| 10,320,624 | B1 * | 6/2019 | Roth ..................... H04L 63/164 |
| 11,206,269 | B1 * | 12/2021 | Van Deman ............ G06F 21/45 |
| 2002/0035675 | A1 * | 3/2002 | Freerksen ........... G06F 12/0831 711/146 |
| 2019/0361726 | A1 | 11/2019 | Nakagawa et al. |

* cited by examiner

*Primary Examiner* — Kevin Verbrugge
(74) *Attorney, Agent, or Firm* — Foley & Lardner LLP

(57) ABSTRACT

An access control system stores information defining conditions under which each user is allowed to perform resource access. The access control system acquires a first access request indicating an operation for a first resource in a target system by a first user, determines based on the information whether or not the first access request is permitted, acquires a result of an additional permission/disapproval determination of the first access request in response to the disapproval determination of the first access request, and grants execution authority of the first access request by the first user according to the result of the additional permission/disapproval determination indicating permission.

14 Claims, 10 Drawing Sheets

FIG. 3

| # | ITEM | DESIGNATED EXAMPLE | |
|---|---|---|---|
| 1 | RESOURCE URI | http://sample.domain.com/storage/Pool/ | ~301 |
| 2 | OPERATION | PATCH | ~302 |
| 3 | PARAMETER 1 | POOL_ID=5 | ~303 |
| 4 | PARAMETER 2 | POOL_TYPE=TYPE3 | ~304 |
| 5 | PARAMETER 3 | POOL_SIZE=1,000 | ~305 |

STORAGE RESOURCE ACCESS COMMAND

FIG. 4

| # | AUTHENTICATION TYPE | OUTLINE | |
|---|---|---|---|
| 1 | PASSWORD | COLLATE PASSWORD INPUT BY USER WITH INFORMATION IN USER MANAGEMENT TABLE OF AUTHENTICATION PLATFORM | ~321 |
| 2 | OTP | GENERATE ONE-TIME PASSWORD ON USER TERMINAL AND AUTHENTICATION PLATFORM AND COLLATE PASSWORD INPUT BY USER ON BOTH SIDES | ~322 |
| 3 | FINGERPRINT | COLLATE DATA BASED ON FINGERPRINT OF USER ACQUIRED BY USING FINGERPRINT SENSOR CONNECTED TO USER TERMINAL OR THE LIKE WITH REGISTERED DATA OF AUTHENTICATION PLATFORM | ~323 |
| 4 | FACE | COLLATE DATA BASED ON FACE IMAGE OF USER ACQUIRED BY USING CAMERA OR THE LIKE CONNECTED TO USER TERMINAL OR THE LIKE WITH REGISTERED DATA OF AUTHENTICATION PLATFORM | ~324 |
| 5 | VEIN | COLLATE DATA BASED ON VEIN PATTERN OF USER COLLECTED USING INFRARED SENSOR OR THE LIKE CONNECTED TO USER TERMINAL OR THE LIKE WITH REGISTERED DATA OF AUTHETICATION PLATFORM | ~325 |

AUTHENTICATION TYPE

FIG. 5

User Management Table (131)

| ID (351) | USER (352) | GROUP (353) | ... | INITIAL ROLE (355) | ADDITIONAL ROLE | | |
|---|---|---|---|---|---|---|---|
| | | | | | ROLE (357) | VALIDITY PERIOD (358) | ACCESS ENVIRONMENT (359) |
| 1 | USER1 | GROUP1 | ... | ROLE1, ROLE2 | ROLE4 | 8 HOURS | CONSOLE |
| 2 | USER2 | GROUP1 | ... | ROLE1, ROLE3 | ROLE7 | NONE | VPN CONNECTION |
| 3 | USER3 | GROUP2 | ... | ROLE1, ROLE5 | ROLE8 | 7 DAYS | ARBITRARY |
| ... | ... | ... | ... | ... | ... | ... | ... |
| ... | ... | ... | ... | ... | ... | ... | ... |

USER MANAGEMENT TABLE

FIG. 6

Policy Management Table (142)

| ID (371) | ROLE (372) | POLICY | |
|---|---|---|---|
| | | RESOURCE (374) | OPERATION (375) |
| 1 | ROLE1 | /Obj/Volume /Obj/LUN /Obj/Pool /Obj/Performance | GET |
| 2 | ROLE2 | /Obj/Volume | POST, PATCH |
| 3 | ROLE3 | /Obj/LUN | POST, PATCH |
| 4 | ROLE4 | /Obj/Pool | POST, PATCH |
| 5 | ROLE5 | /Obj/Drive | GET |
| 6 | ROLE6 | /Obj/Parity_Group | POST |
| 7 | ROLE6 | /Obj/SpareDrive | PATCH |
| 8 | ROLE7 | /Obj/Local_Copy | POST, PATCH |
| 9 | ROLE8 | /Obj/Remote_Copy | POST, PATCH |
| ... | ... | ... | ... |

POLICY MANAGEMENT TABLE

DETERMINATION AUXILIARY INFORMATION MANAGEMENT TABLE

RESOURCE ACCESS MANAGEMENT TABLE the first user according to the result of the additional permission/disapproval determination indicating permission.

According to a typical example of the present invention, it is possible to allow the user to perform the required resource access while suppressing the deterioration of the security of the system. Problems, configurations and effects other than those described above will be clarified by the description of the following embodiments.

ACCESS CONTROL SYSTEM AND ACCESS CONTROL METHOD

CLAIM OF PRIORITY

The present application claims priority from. Japanese patent application JP 2022-021028 filed on Feb. 15, 2022, the content of which is hereby incorporated by reference into this application.

BACKGROUND

The present invention relates to access control to a resource. A function to prevent unauthorized access and enhance security is used by performing control to limit access to a resource such as a storage system to an authorized user. In RBAC (Role Based Access Control), which is one of the frequently used access control methods, a role to which an access privilege is granted is assigned to a user who accesses a resource depending on the role of the work, etc., and on the basis of the role assigned to the user, an authorization determination unit determines whether or not access to the resource is permitted, and authorizes the access.

For example, as a prior document disclosing the background art of the present disclosure, there is known US Unexamined Patent Application Publication No. 2019/0361726. US Unexamined Patent Application Publication No. 2019/0361726 discloses access control for resources utilizing virtualization technology. Specifically, a computer system having a plurality of resources includes resource management information which stores information associated with resources and resource groups, and resource group management information which stores information associated with users and programs that can utilize the resource groups. When receiving a request which specifies the resource for the user who uses the program, from a resource utilization program, a control unit uses the resource group management information and the resource management information to determine whether or not access to the resource related to the request is permitted.

SUMMARY

In order to avoid the risk of granting unnecessary privileges to users, the resource access privileges granted in advance have heretofore been limited. In this case, the resource access privilege needed later may not have been granted to the user. On the contrary, in order to improve the convenience of the user, the resource access privilege that may be required later has been given in advance. In this case, there is a risk that unnecessary resource access execution authority is granted so that security is deteriorated.

A typical example of the present disclosure is an access control system which controls user access to a resource. The access control system includes at least one processor, and at least one storage device which stores information defining conditions under which each user is allowed to perform resource access. The at least one processor acquires a first access request indicating an operation for a first resource in a target system by a first user, determines based on the information whether or not the first access request is permitted, acquires a result of an additional permission/disapproval determination of the first access request in response to the disapproval determination of the first access request, and grants execution authority of the first access request by the first user according to the result of the additional permission/disapproval determination indicating permission.

BRIEF DESCRIPTION OF THE DRAWINGS

FIG. 3 shows an example of a resource access command issued by a command acquisition unit of a user terminal;

FIG. 4 shows an example of an authentication type that a user authentication unit can use for user authentication;

FIG. 5 shows an example of a user management table;

FIG. 6 shows an example of a policy management table;

DETAILED DESCRIPTION

Figure 1:
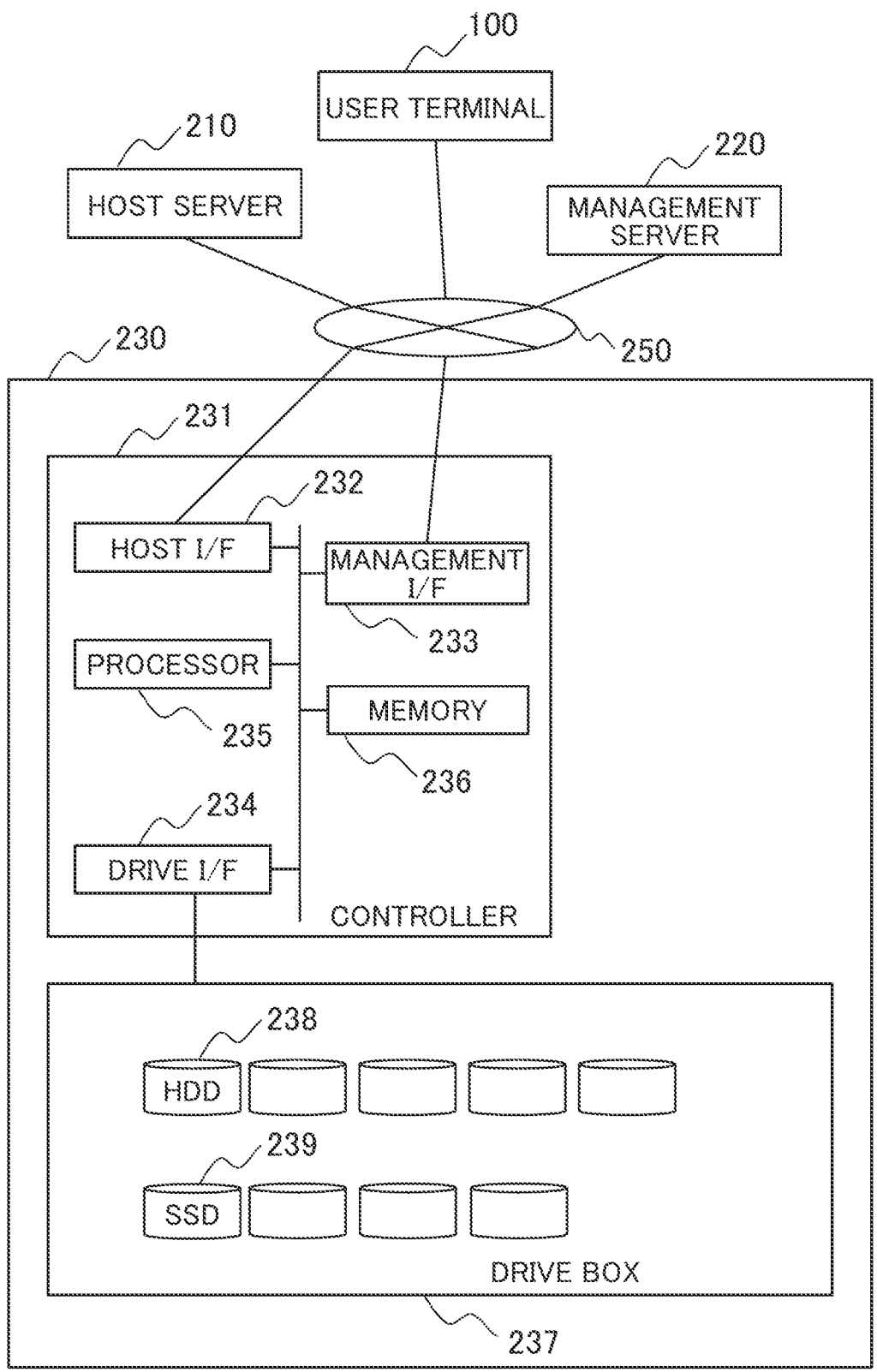
FIG. 1 shows a configuration example of a computer system according to a first embodiment of the present specification.

Hereinafter, embodiments of the present invention will be described with reference to the accompanying drawings. Incidentally, the following description and drawings are examples for explaining the present invention, and are appropriately omitted and simplified for the purpose of clarifying the description. The present invention can be implemented even in various other forms. Each component may be singular or plural unless otherwise specified.

Further, the embodiments described below do not limit the invention according to claims, and all of combinations of elements described in the embodiments are not necessarily essential for the solution of the invention.

In the following description, various information may be explained by expressions such as a "table" and a "list", but various information may be expressed by a data structure other than these. In order to show that they do not depend on the data structure, an "xxx table", an "xxx list" and the like may be referred to as "xxx information" and the like. In the following description, when identification information is described, expressions such as "identification information", "name", and "ID" are used, but these can be replaced with each other.

In the following description, when there are a plurality of components having the same or similar functions, they will be described with basically given the same reference numerals, but even if the functions are the same, means for realizing the functions may differ. Further, the embodiments of the present invention to be described later may be implemented by software running on a general-purpose computer, or may be implemented by dedicated hardware or a combination of software and hardware.

Further, in the following description, the processing may be described with a "program" as the subject, but the program is executed by a processor (for example, CPU: Central Processing Unit) to appropriately perform specified processing while using a storage resource (for example, memory) and/or an interface device (communication port) or the like. Therefore, the main body of processing may be described as a processor.

The processing described with the program as the subject may be processing performed by a computer (for example, a calculation host or a storage device) having a processor. Further, in the following description, the expression of "controller" may refer to a processor or a hardware circuit which performs a part or all of the processing performed by the processor.

The program may be installed in each computer from a program source (e.g., a program distribution server or a computer-readable storage medium). In this case, the program distribution server includes a CPU and a storage resource. By further storing a distribution program and a program to be distributed in the storage resource, and executing the distribution program by the CPU, the CPU of the program distribution server may distribute the program to be distributed to another computer.

Also, in the following description, two or more programs may be realized as one program, or one program may be realized as two or more programs.

Further, in the following description, a storage drive or simply a drive means a physical storage device and may typically be a non-volatile storage device (e.g., an auxiliary storage device). The drive may be, for example, an HDD (Hard Disk Drive) or an SSD (Solid State Drive). The storage system may have a mixture of different types of drives.

Hereinafter, resource access control according to an embodiment of the present specification will be described. A storage system and the like are required to have a security function that limits an access to a resource to an authorized user. However, when the user requests a resource access other than the resource access permitted in advance due to a change in the situation or the like, the resource access could not be executed in the past.

For example, in an RBAC (Role Based Access Control) method, one role may be granted a plurality of related resource access privileges. In this case, there is a possibility that by assigning the role given the resource access privilege that the user needs to execute to the user in order to grant the resource access privilege, other resource access privileges that are given to the same role and that the user does not need to execute may be granted at the same time.

On the other hand, it may be necessary to have operation authority that exceeds the authority range of the role assigned to the user in advance. For example, when it is necessary to subdivide storage management authority for multi-tenant support, etc., or when the required authority changes between development and production operation in DevOps, etc., the work range of the user may be temporarily expanded, or initially unexpected work may occur.

In a storage system or the like which requires resource access control, the work performed by a storage provider such as a vendor who performs system configuration and initial setting work and a storage operation administrator such as a customer who manages the operation of the storage system is different. In order to prevent troubles such as the user in charge of each of them performing an operation that does not need to be executed by mistake, it is necessary to grant only the operation authority necessary for the work in charge.

Since the operation administrator executes provisioning operations of a provided storage configuration such as volume setting in normal work, only the authority to execute these operations is usually granted in advance. However, when an operating state deteriorates, for example, in the cases where the size of a pool in which the volume is created becomes tight, and where the load of IO becomes high, etc., the execution authority for operations such as expanding the pool size may be temporarily required.

From the viewpoint of avoiding the risk of failure due to setting mistakes, etc., when the operation administrator is not granted the authority to execute pool editing operations that involve configuration changes in defaults, the operation administrator could not perform a resource access command to execute a pool size expansion operation conventionally when requesting the resource access command.

When the user needs to perform a resource access that deviates from the scope of the granted authority, previously the system administrator has been requested to grant the resource access privilege before the user performs the resource access, and the system administrator had to determine the necessity of granting the access privilege, identify the role required for granting the access privilege by referring to a manual, etc., and manually execute the command to change the role assignment.

Also, when the user tries to perform another resource access related to the resource access for which authorization is requested in a series of operations, and the access privilege to the resource is not granted, the system administrator was requested again to grant the resource access privilege, and the system administrator had to determine the assignment of the role and perform its assignment.

Further, after executing the resource access, it was necessary to determine whether it was necessary to continue to grant the relevant privilege, and to cancel the role assignment if it was unnecessary. Thus, it is complicated and time-consuming for the system administrator to manually change and restore the role assignment each time the execution range of the user's resource access changes.

In one embodiment of the present specification, when the user makes an access request indicating an operation to a resource, the user refers to information describing conditions for determining an access privilege, and determines whether or not the access request can be executed based on the information. When it is determined that the user is not authorized to execute the access request (in the case of non-permission determination), the permission or disapproval of the authority to execute the access is additionally determined, and the authority is granted based on this. The additional determination can be automatically executed by the system administrator or the access control system which has received the request from the access control system.

Consequently, when the resource access execution authority assigned to the user in advance is limited to the required range, and the user requests a resource access that requires unauthorized authority during operation, it is determined whether the request is appropriate, and it is possible to authorize the execution authority of the resource access. As a result, it becomes possible to perform access management high in security. The features of the present disclosure can be applied to resource access control to a target system different from the storage system. The access execution authority may be given according to the role of the user or may be given based on other condition items, for example.

First Embodiment

FIG. 1 shows a configuration example of a computer system according to a first embodiment of the present specification. The computer system includes a user terminal 100, a host server 210, a management server 220, and a storage system 230. These can communicate via a network 250. Incidentally, the number of each of these components is arbitrary. Further, the user terminal 100 may include the functions of the host server 210 or the management server 220.

A method of the network 250 may be, for example, a LAN (Local Area Network) or a SAN (Storage Area Network). The host server 210 and the management server 220 may access the storage system 230 via different networks, and the user terminal 100 may access the host server 210 or the management server 220 via a network different from the network 250.

The user terminal 100 is a device which allows a user to access the computer system. The user terminal 100 can have, for example, a general computer configuration and includes one or more processors, one or more storage devices, one or more network interfaces, and one or more input/output interfaces. The user terminal 100 may include hardware dedicated to specific processing.

The host server 210 is a host machine on which a user application or the like operates. The host server 210 can have, for example, a general computer configuration and includes one or more processors, one or more storage devices, and one or more interfaces. The host server 210 may include hardware dedicated to specific processing. The host server 210 can execute various software programs. For example, the host server 210 executes a database or a Web service and writes and reads the data created by them into and from the storage system 230 via the network 250. The host server 210 may execute a resource-using application to be described later.

The management server 220 manages the storage system 230. The management server 220 can have, for example, a general computer configuration and includes one or more processors, one or more storage devices, and one or more interfaces. The management server 220 may include hardware dedicated to specific processing. The management server 220 may execute a software program which manages authentication and an authorization system described later.

The computer system includes the authentication and authorization system described later. The storage system 230 includes a controller 231 and a drive box 237. The controller 231 includes a host interface 232, a management interface 233, a drive interface 234, a processor 235, and a memory 236. The number of these components is arbitrary.

The host interface 232 is an interface device for communication with the host server 210. The management interface 233 is an interface device for communication with the management server 220. The drive interface 234 is an interface device for communication with the drive box 237.

The drive box 237 houses one or more non-volatile or volatile storage drives which store various data used by the application program of the host server 210. The drive box 237 is connected to the drive interface 234 of the controller 231. In the configuration example of FIG. 1, the drive box 237 includes a plurality of hard disk drives (HDD) 238 and a plurality of solid state drives (SSD) 239. The plurality of storage drives 238 and 239 may constitute a RAID (Redundant Arrays of Independent Disks) group for data redundancy.

The controller 231 controls the storage system 230. The controller 231 provides the host server 210 with a volume for storing the data of the host server 210. The controller 231 allocates physical storage areas of the storage drives 238 and 239 to the volumes and stores the data in the storage drives 238 and 239. The controller 231 provides the host server 210 with a function as the storage.

The processor 235 gives an instruction to transfer the data stored in the corresponding drive box 237 in response to a read command or a write command from the host server 210. The memory 236 of the controller 231 is comprised of, for example, a semiconductor memory such as an SDRAM (Synchronous Dynamic Random Access Memory). The memory may be configured in combination with a volatile memory and a non-volatile memory.

The processor 235 executes processing for controlling the storage system 230 and communicating with the host server 210, the management server 220, and the drive box 237. The memory 236 stores a program for control and communication and various data as the main memory of the processor 235. The memory 236 stores a software program which realizes the authentication and authorization system described later. Further, the memory 236 is also used as a disk cache (cache memory) of the controller 231. The processor 235 realizes a predetermined function by executing a program including an instruction code stored in the memory 236.

A plurality of controllers may be implemented for redundantization. The plurality of controllers communicate via a network in the storage system 230. The controller performs the duplication of write data, the sharing of metadata, and the like via the network. Even if one controller is blocked due to maintenance or failure or the like, the storage processing can be continued by the other controller.

Incidentally, the computer system may include other than those shown here. For example, network devices such as switches and routers may be connected in between to networks. Further, they may be configured to be connected to a storage service on a public cloud via an external network.

Figure 2:
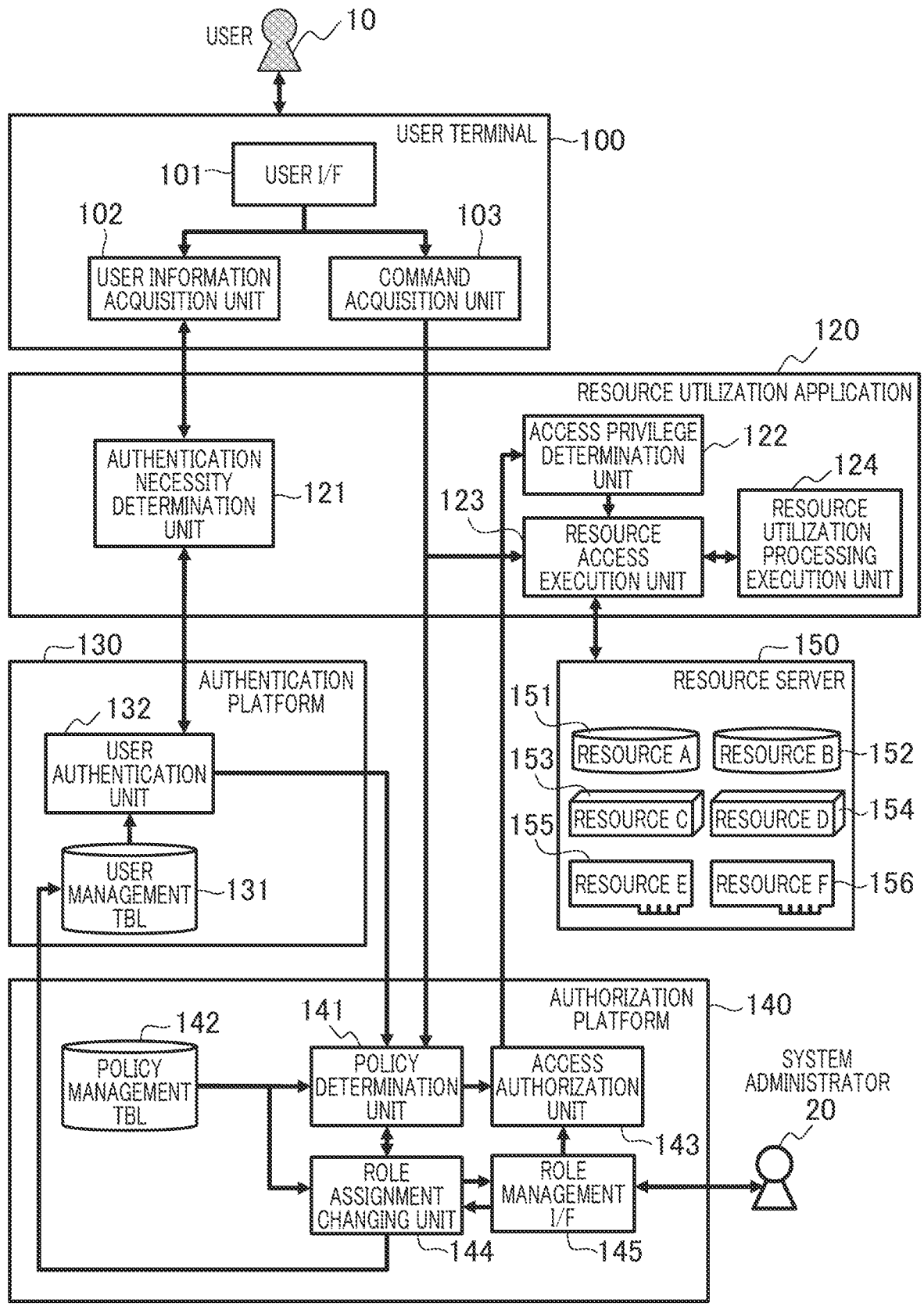
FIG. 2 typically shows a logic configuration example of the computer system.

FIG. 2 typically shows a logic configuration example of the computer system according to the first embodiment of the present specification. The computer system includes a resource access authentication and authorization system. The computer system includes a resource utilization application 120, an authentication platform 130, an authorization platform 140, and a resource server 150. These represent software components implemented in the computer system or functional components realized by, for example, a processor.

The resource utilization application 120 is included in the host server 210, for example. The authentication platform 130, the authorization platform 140, and the resource server 150 are included in the storage system 230, for example. Which hardware device each function is implemented in depends on the design of the computer system. An external identification service like IDaaS (Identity as a service) may be used as the authentication platform 130 and/or the authorization platform 140, for example.

As shown in FIG. 2, the user 10 uses the user terminal 100 to access a software resource or a hardware resource of the computer system. The user terminal 100 accesses the resource utilization application 120 in response to an input from the user. The user requests resource access by issuing a target resource, an operation for the resource, and a command specifying operation parameters to the resource utilization application 120 via the user terminal 100.

The user terminal 100 includes a user interface (I/F) 101, a user information acquisition unit 102, and a command acquisition unit 103. The user interface 101 is a user interface for the user 10 to request execution of a resource operation using the user terminal 100, and for example, a Web browser can be utilized.

The user information acquisition unit 102 acquires user information such as a user name, an account name, a login ID, and a password, etc. input by the user 10. The command acquisition unit 103 acquires the resource access command input by the user via the user interface 101 and transmits it to a policy determination unit 141 of the authorization platform 140 and a resource access execution unit 123 of the resource utilization application 120.

The resource utilization application 120 accesses resources such as a storage, compute (including bare machines, VMs, and containers), and a network to execute processing. The resource utilization application 120 includes an authentication necessity determination unit 121, an access privilege determination unit 122, a resource access execution unit 123, and a resource utilization processing execution unit 124.

When the user 10 makes a resource access request, the authentication necessity determination unit 121 acquires information identifying the user, for example, an account name from the user information acquisition unit 102 of the user terminal 100, and determines whether authentication is required or the user is an already-authenticated user. When the authentication is required and the user is not authenticated, the authentication necessity determination unit 121 requests the authentication platform 130 to make authentication. When the user 10 receives the notification that the authentication has already been made or the authentication has been completed by the authentication platform 130, the authorization platform 140 is requested to determine the authorization of the resource access request.

The resource access execution unit 123 acquires a resource access command from the command acquisition unit 103 of the user terminal 100. Incidentally, the resource access command acquisition by the resource access execution unit 123 may be performed after the access to the resource and the execution of the operation are authorized as a result of the determination by the policy determination unit 141 of the authorization platform 140.

The access privilege determination unit 122 determines whether the resource access requested by the user 10 is authorized. If authorized, the access privilege determination unit 122 permits the resource access execution unit 123 to execute the resource access command.

The resource access execution unit 123 issues the resource access command to the resource server 150. The resource utilization processing execution unit 124 executes predetermined processing based on the resource access.

The authentication platform 130 executes user authentication when an authentication request is received from the authentication necessity determination unit 121 of the resource utilization application 120. The authentication platform 130 includes a user authentication unit 132 and a user management table (TBL) 131. The user authentication unit 132 processes the sign-in from the user 10. Specifically, the user authentication unit 132 authenticates that the user 10 is the user himself/herself registered in the computer system in advance by using, for example, a password and/or biological information on a fingerprint or a face, etc. input from the user 10 via the user terminal 100.

In the user management table 131, information on users registered as authentication targets, for example, a user name, an occupational post, an E-mail address, a password, information for collating biological information, an assigned role, an affiliation group, access date and time, etc. are stored. The user authentication unit 132 performs user authentication by collating the user information input by the user 10 at the time of sign-in with the information stored in the user management table 131.

When the authentication is successful by the user authentication unit 132, the user authentication unit 132 transmits the user information including the role assigned to the user to the policy determination unit 141 of the authorization platform 140.

Incidentally, the user information acquired when the user authentication is first executed is retained in any or all of the resource utilization application 120, the authentication platform 130, and the authorization platform 140 while the authentication of the target user is valid (during a valid session). When a resource access request is issued by the same user, the policy may be determined using the retained user information. The retained user information may be discarded at the end of the session validity period.

The authorization platform 140 determines whether the user 10 authenticated by the authentication platform 130 has the privilege to access the resource requested to be accessed by the user 10 and the privilege to execute the operation on the resource. When the user 10 has the access privilege and the execution authority of the operation, the authorization platform 140 authorizes the execution. When the user 10 does not have the access privilege or the execution authority of the operation, the authorization platform 140 does not authorize the execution.

The authorization platform 140 includes the policy determination unit 141, a policy management table 142, an access authorization unit 143, a role assignment changing unit 144, and a role management interface 145.

The policy determination unit 141 acquires user information including role information for the authenticated user from the user authentication unit 132. Further, the policy determination unit 141 acquires the information on the resource targeted by the requested resource access command and the operation for the resource from the command acquisition unit 103 of the user terminal. The policy determination unit 141 collates them with the access policy information (policy information) stored in the policy management table 142, and determines whether the user 10 has the access privilege to the requested resource and the operation execution authority.

The policy management table 142 stores the policy information used in the policy determination unit 141. The policy information includes, for example, a role, an authority granted to the role, a resource to which the authority permits access, and a determination rule associated with an operation permitted to the resource. The policy determination unit 141 refers to the policy management table 142, and determines whether the role assigned to the user 10 authenticated by the user authentication unit 132 is given authority to execute the requested resource access and the operation for the resource.

When the user 10 has the access privilege to the requested resource and the execution authority of the request operation as a result of the determination by the policy determination unit 141, the access authorization unit 143 authorizes the access and operation to the resource. The access authorization unit 143 transmits an authorization code to the resource utilization application 120.

When the role to which the execution authority of the resource access command requested by the user is granted is not assigned to the user in the policy determination unit 141, the role assignment changing unit 144 acquires the role granted the execution authority of the resource access command from the policy management table 142. The role assignment changing unit 144 further transmits the resource access request and the information of the user who requested the resource access, which are acquired via the policy determination unit 141 to the role management interface 145.

The role management interface 145 presents the requested resource access information and the information of the user who requested the resource access to the system administrator, and requests an additional determination of whether or not the resource access request is permitted.

The system administrator 20 additionally determines the validity of granting the execution authority of the requested resource access command on the basis of these information presented via the role management interface 145. When it is determined that the authorization is valid, the system administrator 20 permits the authorization and inputs that the authorization is permitted using the role management interface 145.

Incidentally, the role assignment changing unit 144 transmits information of the role to which the requested resource access command execution authority is granted to the role management interface 145, and the role management interface 145 may present the role information to the system administrator. In this case, the system administrator 20 can confirm what role is to grant the execution authority of the requested resource access command.

When the system administrator 20 permits the authorization, the role management interface 145 transmits a notification indicating that the authorization is granted to the role assignment changing unit 144. The role assignment changing unit 144 adds a role that grants the authority to execute the resource access command permitted in response to the permission notification to the role assignment information included in the user information of the user who requested the resource access. The role assignment information is held in any or all of the resource utilization application 120, the authentication platform 130, and the authorization platform 140. The role assignment changing unit 144 further notifies the policy determination unit 141 of the changed role assignment.

The policy determination unit 141 authorizes the execution of the requested resource access by executing the policy determination again based on the changed role assignment. Further, the role assignment changing unit 144 updates the role assignment information of the corresponding user stored in the user management table 131 of the authentication platform 130 based on the changed role assignment information.

The role assignment information in the user management table 131 may be updated, for example, at the timing when the assignment change occurs or at the timing when the policy determination is executed, or may be periodically updated at the frequency at which the role assignment information becomes the latest at the time of the policy determination. Consequently, the latest role assignment information is used at the time of the next policy determination.

The role assignment information held in any of the resource utilization application 120, the authentication platform 130, and the authorization platform 140, or all of them may be discarded together with the session information when the session validity period ends.

In another example, the retained user information is synchronized with the role assignment information of the user management table 131 of the authentication platform 130 by using the usual means of assigning a role to the user at the above timing or other necessary timing and may be used when starting a new session. Thus, when a new resource access is requested by the same user after the session validity period ends, the policy determination can be executed based on the changed role assignment information.

When adding a role, restriction conditions such as providing the validity period as needed, limiting the access environment (limiting to access from the console, requiring a VPN connection, etc.), restricting an accessible resource or an execution operation, etc. are set by the system administrator or system settings, and the restriction conditions are determined at the time of policy determination, and authorization may not be performed where the conditions are not satisfied.

Incidentally, the role management interface 145 transmits the authority grant/disapproval determination result by the system administrator 20 to the access authorization unit 143. When the access privilege to the resource requested by the user 10 and the granting of the execution authority of the request operation are permitted, the access authorization unit 143 may grant the access and operation to the resource and transmit the authorization code to the resource utilization application 120. In this case, it is not necessary to re-execute the policy determination, based on the role information whose assignment has been changed, and the execution authority can be granted for each individual resource access request.

When the system administrator 20 does not permit the execution of the requested resource access, the access authorization unit 143 transmits a non-authorization message (error code) to the access privilege determination unit 122. The access privilege determination unit 122 may transmit the non-authorization message to the user terminal 100 as necessary, and present information corresponding to the non-authorization message to the user 10 via the user terminal 100.

The resource server 150 manages resources of a data storage (volume, pool, file directory, etc.), a compute (VM, container, etc.), and a network (domain, port, channel, protocol, etc.). The resource server 150 includes one or more resources.

A resource example A151 is, for example, a volume of data storage, and a resource example B152 is, for example, a file directory of data storage. A resource example C153 is, for example, a compute VM (virtual machine), and a resource example D154 is, for example, a compute Docker container. A resource example E155 is, for example, a domain of a network resource, and a resource example F156 is, for example, a port of a network resource.

Incidentally, FIG. 2 shows an example of the flow of authentication, authorization, and resource access processing according to the first embodiment of the present specification. An authentication and authorization protocol can be executed based on, for example, standards such as OAuth2, OpenID Connect, and SAML. Data (various tokens) containing information necessary for authentication and authorization is exchanged between the user terminal 100, the resource utilization application 120, the authentication platform 130, and the authorization platform 140, and the authentication and authorization processing is performed while maintaining security.

As described above, the user 10 uses the user terminal 100 to transmit the resource access command. FIG. 3 is an example of a resource access command issued by the command acquisition unit 103 of the user terminal 100. FIG. 3 shows command items 311 and their designated examples 312. In response to this command, the resource access execution unit 123 issues a resource access command to the resource server 150. The resource access command designates a target resource, the operation for the resource, a parameter in the operation, and the like.

FIG. 3 is an example of a storage resource access command. For example, a storage resource access can be performed using an application programming interface like REST API. The resource to be accessed is, for example, a data storage area of a storage system such as a pool or a volume. As described above, the resource which is accessed and manipulated is not limited to a storage resource.

A resource URI (Universal Resource Identifier) 301 to be accessed identifies the resource (pool in this example). For the resource designated in the resource URI301, the storage resource access command defines the operation 302 for changing the pool size.

The parameters specified for the operation 302 include a storage pool ID303, a pool type 304, a pool size 305. The operation 302 example also includes pool creation, pool deletion, pool information acquisition, and the like.

Another example of resource access makes access to a compute resource to create, delete, or modify a virtual machine (VM) or Docker Container. Other examples of resource access makes access to a network resource to acquire information for a particular domain or create a particular network port.

When the user 10 requests resource access via the user terminal 100, the authentication necessity determination unit 121 in the resource utilization application 120 determines whether the user 10 has already been authenticated. In the case of the user 10 who has not been authenticated yet, the user authentication unit 132 of the authentication platform 130 is requested to authenticate the user.

The user authentication unit 132 executes user authentication using a single authentication type or a combination of a plurality of authentication types, and determines whether or not the user is a valid user. As the authentication method, the known method used in various authentication systems can be used. It is also possible to outsource authentication processing to an external authentication system.

FIG. 4 is an example of an authentication type which can be used by the user authentication unit 132 in user authentication. FIG. 4 shows authentication types 331 and their outlies 332. As examples of the authentication type, there are shown password authentication 321, one-time password authentication 322, fingerprint authentication 323, face authentication 324, and vein authentication 325.

The password authentication 321 collates the password input by the user 10 with the information in the user management table 131 of the authentication platform 130. The one-time password authentication 322 generates a one-time password on each of the user terminal 100 and the authentication platform 130, and collates the password input by the user 10 on both sides.

The fingerprint authentication 323 collates data based on the fingerprint of the user 10 acquired by using a fingerprint sensor connected to the user terminal 100 or the like with the registered data in the user management table 131. The face authentication 324 collates data based on a face image of the user 10 acquired by using a camera or the like connected to the user terminal 100 or the like with the registered data of the user management table 131. The vein authentication 325 collates data based on a vein pattern of the user 10 acquired by using an infrared sensor or the like connected to the user terminal 100 or the like with the registered data of the user management table 131.

FIG. 5 is an example of the user management table 131 which stores user information therein. In the user information, there are stored, for example, a user name, an occupational post, an E-mail address, a password, information for collating biological information, an assigned role, an affiliation group, access date and time, etc. Further, the role added at the time of requesting each resource access and the restrictions on the additional role, etc. according to the first embodiment of the present specification are stored.

FIG. 5 shows a user ID351, a user name 352, and an affiliation group 353 as examples of user information other than the roles. An initial role 355 and an additional role 356 are shown as user role information. The additional role 356 indicates a role name (role ID) 357, and a validity period 358 and an access environment 359 as restrictions.

In FIG. 5, for example, a user name User1, an affiliation group Group1, and initial allocation roles Role1 and Role2 are set for the user with ID1. Further, as an additional role according to the first embodiment of the present specification, Role4 is stored, and as a limitation of the additional role, a validity period of "8 hours" and an access environment of the "console" are stored.

Of these, the initial role 355 indicates a role assigned in advance, such as when a user is registered in an access control target system. Further, the additional role 356 indicates a role assigned when the user requests resource access for which the user does not have the execution authority, using the first embodiment of the present specification. In the example of FIG. 5, the validity period 358 and the access environment 359 are set as the restrictions of the added role.

FIG. 6 is an example of the policy management table 142 storing the policy information therein. For each role, the operation that grants execution authority and the target resource are associated. Specifically, the policy management table 142 shown in FIG. 6 shows a role ID371, a role name 372, and a policy 373. The policy 373 indicates a resource 374 and an operation 375 associated with the role.

For example, in the role Role1, a volume (/Obj/Volume), a LUN (Obj/LUN), a pool (/Obj/Pool), and performance (/Obj/Performance) are granted as target resources, and information acquisition (GET) authority is granted as operations for those resources.

Further, the role Role4 is given operation authority of create (POST) operation and update (PATCH) to the pool (Obj/Pool) resource. Based on this, for example, the user to whom Role1 is assigned is given the authority to acquire information on a volume, a LUN, a pool, and a performance resource. In addition, the user to whom Role4 is assigned is given the authority to create and update a pool resource.

The policy determination unit 141 of FIG. 2 collates a combination of a role assigned to the user who requested the resource access, a resource included in the resource access command, and an operation for the resource, which are extracted by referring to the user management table 131 of FIG. 5, with the policy included in the policy management table 142 of FIG. 6. Based on this, it is determined whether or not the user has the authority to execute the requested resource access.

Figure 7:
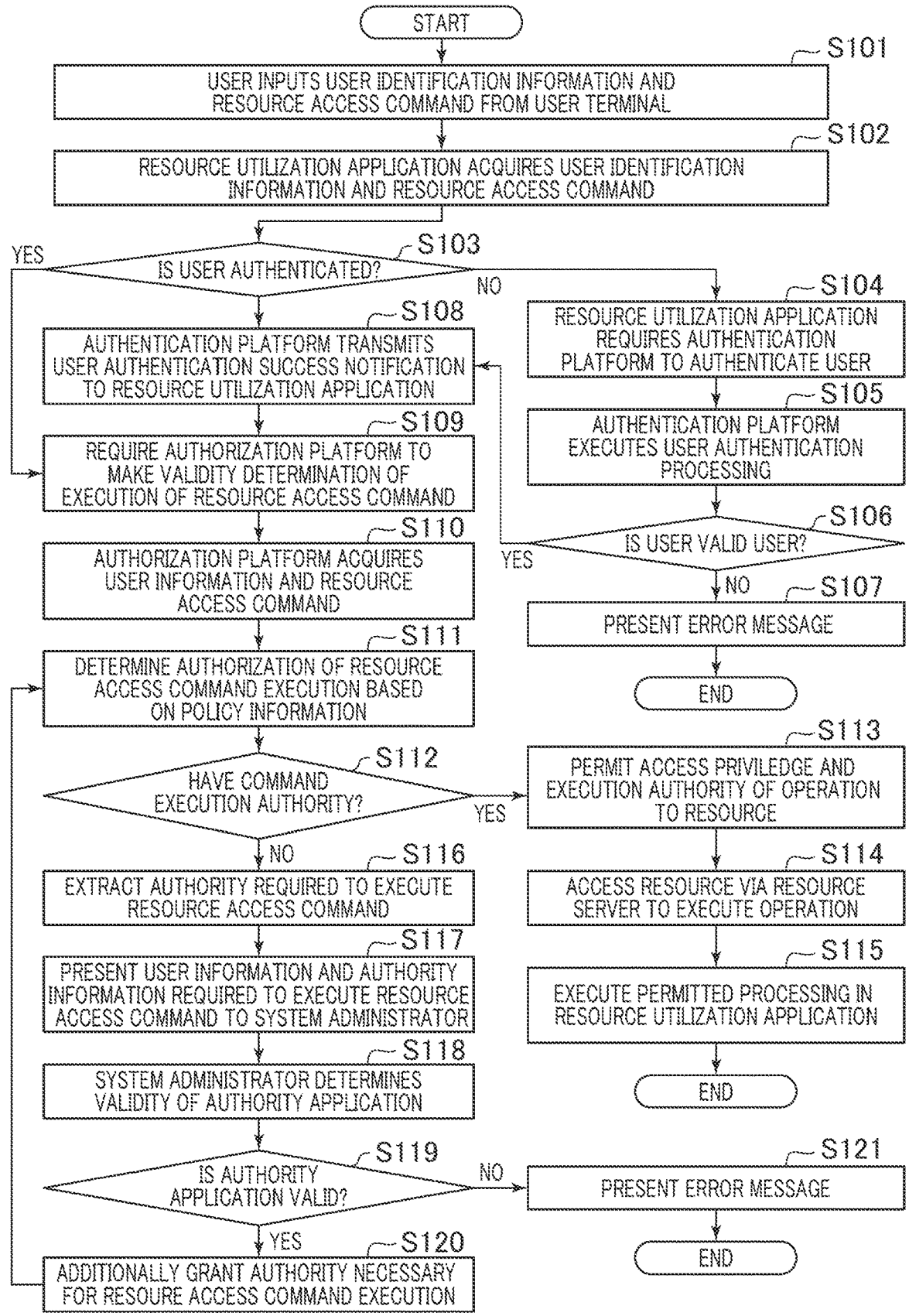
FIG. 7 shows an example of a processing flow of resource access control according to the first embodiment of the present specification.

FIG. 7 shows an example of a processing flow of the resource access authentication and authorization system according to the first embodiment of the present specification. First, the user inputs user identification information and a resource access command from the user terminal 100 (S101).

The resource utilization application 120 acquires the user identification information and the resource access command from the user terminal 100 (S102). The authentication necessity determination unit 121 determines whether or not the user authentication of the user 10 has been completed by referring to the management information indicating the authenticated user (S103).

When the user authentication has not been completed (S103: NO), the authentication necessity determination unit 121 requires the authentication platform 130 to authenticate the user (S104). The user authentication unit 132 of the authentication platform 130 acquires information necessary for user authentication from the authentication necessity determination unit 121 and refers to the user management table 131 to execute user authentication (S105).

When the user is not a valid user (S106: NO), the authentication necessity determination unit 121 acquires its determination result from the user authentication unit 132 and transmits an error message to the user terminal 100. The user terminal 100 presents the error message to the user 10 (S107). As error processing, the application may be terminated, access to the application from the user may be blocked, or the authentication processing may be re-executed by prompting the user to enter a new password, etc.

When the user is the valid user (S106: YES), the user authentication unit 132 transmits a user authentication success notification to the authentication necessity determination unit 121 of the resource utilization application 120 (S108). The authentication necessity determination unit 121 requests the authorization platform 140 to determine the authorization for executing the resource access command (S109) when the user has been authenticated (S103: YES) or when the authentication success notification is received. The authorization platform 140 acquires user information from the authentication platform 130 and a resource access command from the user terminal 100 (S110).

As described above, once the user authentication is executed, the subsequent user authentication is omitted. Consequently, it is not necessary to perform authentication each time the resource is accessed, and the authorization processing for a plurality of resource accesses can be executed by one authentication. Incidentally, the user authentication may be executed for each access request. Authentication may be executed according to an authentication/authorization protocol such as OpenID Connect or SAML. In these protocols, identification information called a token is issued when authentication is successful, and whether or not the user has been authenticated is determined based on the validity determination of the token.

Next, the authorization platform 140 determines whether the user 10 has the authority to execute the requested resource access command (S111). The determination is performed by the policy determination unit 141 collating the role assigned to the user extracted from the user information with the resource access command execution authority given to the role extracted from the policy management table 142 (S112).

When the user 10 has the resource access command execution authority (S112: YES), the access authorization unit 143 authorizes the resource access and transmits an authorization notification to the access privilege determination unit 122 of the resource utilization application (S113). In response to the authorization notification, the access privilege determination unit 122 grants the user 10 the access privilege to the resource and the execution authority of the operation. The resource access execution unit 123 executes the authorized resource access command (S114), and the resource utilization processing execution unit 124 of the resource utilization application 120 executes permitted resource utilization processing (S115).

When the user 10 does not have the resource access command execution authority (S112: NO), its determination result is disallowed. The role assignment changing unit 144 extracts the role to which the resource access command execution authority is granted (S116). Further, the role assignment changing unit 144 presents the user information and the resource access command to the system administrator 20 via the role management interface 145 (S117).

The system administrator 20 determines the validity of the authorization to execute the requested resource access command, based on the presented information (S118). When the system administrator 20 determines that the authority application is valid (S119: YES), the role assignment changing unit 144 additionally assigns the role to which the authority has been granted to the user, and requests the re-execution of the policy determination (S120). The policy determination unit 141 determines again whether or not the user has the resource access command execution authority (S111).

When the authorization determination result by the system administrator 20 indicates that the authority application is not valid (not permitted) (S119: NO), the access authorization unit 143 transmits an error message to the user terminal 100 via the resource utilization application 120, and the user terminal 100 presents the error message to the user 10 (S121). As error processing, the application may be terminated, access to the application from the user may be blocked, or the authorization processing may be re-executed by prompting the user to input a new resource access command, etc. In the above example, the execution authority is given based on the role, but the execution authority for the resource access request may be given based on other condition items such as user attributes such as the current location and the request date and time in addition to the group to which the user who requested the resource access belongs, and the access environment, which are shown by one example in FIG. 5, for example. This point is the same in other examples.

Second Embodiment

In the configuration example of the first embodiment, the system administrator determines the validity of the resource access request of the user to determine the authorization of the resource access execution authority. In a configuration example described below, when a system administrator determines the validity of a resource access request, information including a state such as a system usage state and a user state is utilized as auxiliary information. This enables the system administrator to perform the validity determination in more detail.

Figure 8:
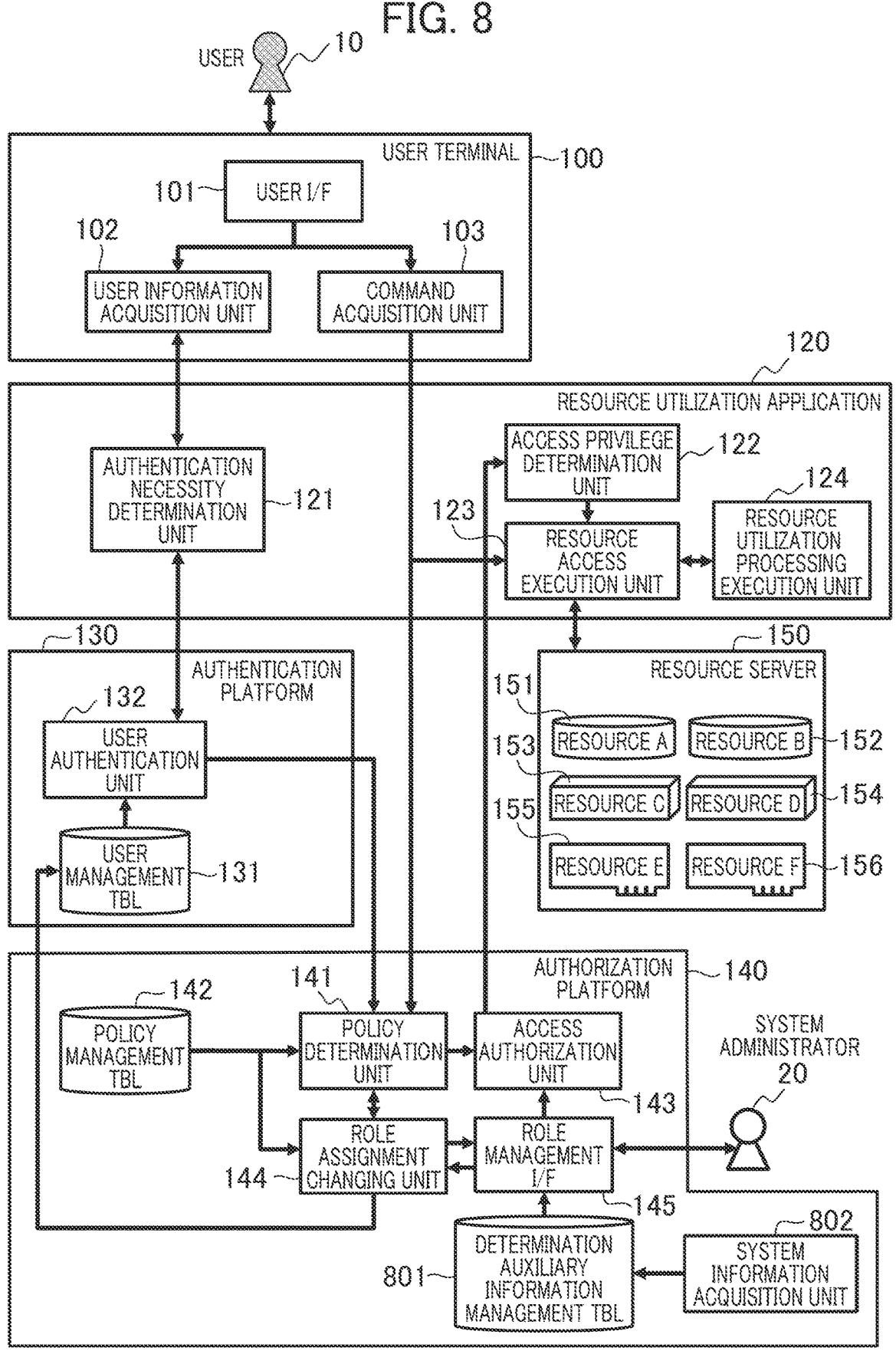
FIG. 8 typically shows a logic configuration example of a computer system according to a second embodiment of the present specification.

FIG. 8 is an example in which when a system administrator 20 determines the validity of a resource access request of a user, a determination auxiliary information management table 801 which stores information that assists the determination, and a system information acquisition unit 802 which acquires the determination auxiliary information are provided with respect to the configuration example shown in FIG. 2.

The determination auxiliary information management table 801 and the system information acquisition unit 802 are included in an authorization platform 140. The determination auxiliary information management table 801 stores information for determining the validity of granting the resource access execution authority to the user. The information for determining the validity of granting the resource access execution authority includes, for example, a state such as the use state of a resource to be accessed, a resource access execution history of a target user, a state such as a situation where a user at the time of the resource access request is placed, and determination conditions for these values, etc.

The system information acquisition unit 802 acquires system information on the state such as the usage state of the resource to be accessed, the resource access execution history of the user, and the state of the user environment or the like at the time of request, etc. from the computer system, and stores the same in the determination auxiliary information management table 801.

When presenting the requested resource access information and the requested user information to the system administrator 20, the role management interface 145 presents the determination auxiliary information together therewith, and the system administrator 20 determines the validity of granting of the resource access privilege requested based on these information.

Figure 9:
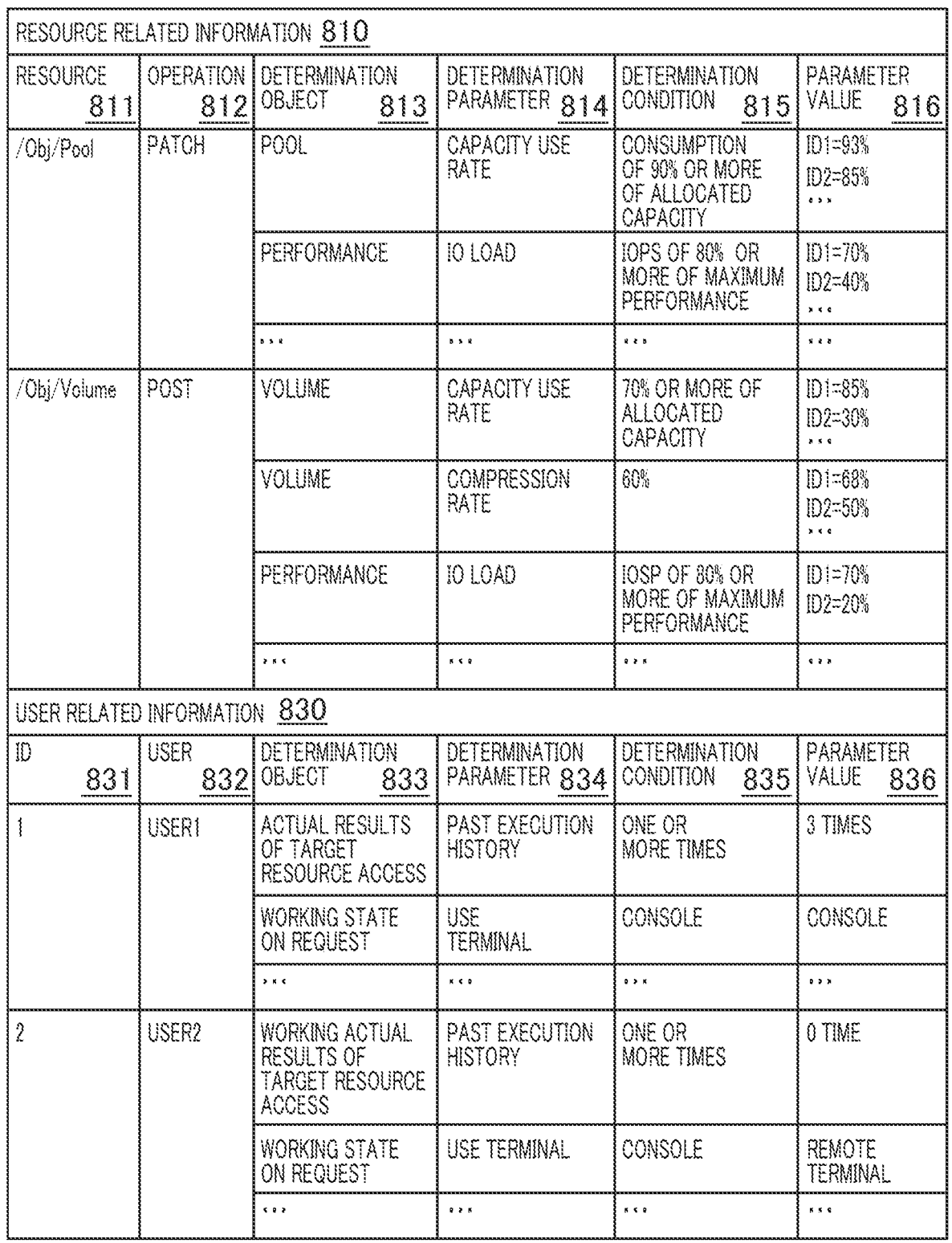
FIG. 9 shows an example of a determination auxiliary information management table.

FIG. 9 is an example of the determination auxiliary information management table 801. The determination auxiliary information management table 801 includes resource-related information 810 and user-related information 830. The resource-related information 810 indicates a resource 811 and an operation 812 for each resource. The resource-related information 810 defines a determination object 813, a determination parameter 814 as a determination criterion in the determination object, and a condition 815 to judge for a determination parameter value with respect to each combination of the resource and the operation.

The user-related information 830 indicates a user ID 831 and a user name 832, and further defines for each user, a determination object 833, a determination parameter 834 as a determination criterion in the determination object, and a condition 835 for making determination against the determination parameter value.

The determination auxiliary information management table 801 further stores a parameter value 816 for the resource at the time of the resource access request and a parameter value 836 for the user. The system information acquisition unit 802 acquires the parameter value and stores it in the determination auxiliary information management table 801. The timing of acquiring the parameter value may be the time when the resource access is requested or the time when the parameter value changes, or may be acquired periodically at an appropriate frequency.

Among the determination auxiliary information, the resource-related information 810 is defined as follows, for example, in response to the execution request of the resource access command for expanding the pool size being pool capacity. A capacity usage rate is defined as the determination parameter 814 for the "pool" of the determination object 813 of ("/Obj/Pool") of the resource 811. The determination condition 815 defines "consumption of 90% or more of the allocated capacity" with respect to the parameter value.

The role management interface 145 presents to the system administrator 20 that the pool capacity usage rate exceeds the determination condition (auxiliary information) when 90% or more of the allocated capacity of the pool is consumed. As a result, the amount of information presented to the system administrator 20 can be reduced.

In the example of FIG. 9, when the ID of the pool for which the user requested the pool size expansion is ID1, the parameter value 816 is 93%. This value exceeds 90% of the determination condition 815. From this information, the system administrator 20 grasps that the pool size is tight. The system administrator 20 uses this as information to assist the determination, and determines whether or not to grant the execution authority of the resource access command that expands the pool size to the user.

Of the determination auxiliary information, the user-related information 830 is defined as follows, for example, in response to the execution request of the resource access command for expanding the pool size. The determination object 833 defines the work record of the target resource access. The determination parameter 834 defines the past execution history. The determination condition defines "one or more times". For example, when the parameter value is the past execution history of one or more times corresponding to the determination condition 835, the role management interface 145 presents to the system administrator 20 that the pool usage rate exceeds the determination condition.

As the determination object, for example, as the working state at the time of request, in addition to the use terminal illustrated in FIG. 9, user attribute information such as the date and time of request and the current location at the time of request is used. Whether the user location and the data and time of request at the time of the resource access request are within a predetermined valid range may be used as a criterion.

Incidentally, the role management interface 145 may present auxiliary information to the system administrator 20 regardless of whether or not the determination condition for the resource or the user is satisfied. The auxiliary information may include the determination condition.

In the example of FIG. 9, the user User1 of ID1 satisfies the determination condition 835 because the parameter value 836 is set to be three times. On the other hand, User2 does not satisfy the determination condition 835 because the parameter value 836 of the past execution history is 0 times. Using this information, the system administrator 20 grasps whether the user has executed the requested resource access command in the past, and determines whether or not to grant the execution authority of the resource access command.

As described above, the system administrator 20 can know the necessity of the resource operation by the user and the probability (safety) of the occurrence of a problem when the resource operation is permitted, by the auxiliary information. Thus, the system administrator 20 can make a more appropriate determination. Incidentally, the system administrator 20 may be presented with auxiliary information of only one of the resource or the user, for example, only auxiliary information about the resource.

Third Embodiment

In the configuration example of the second embodiment, when the system administrator determines the validity of the resource access request of the user to decide whether or not to allow the resource access execution authority, the state such as the system usage state and the user information are used as the determination auxiliary information. In a configuration example described below, the system uses the determination auxiliary information on behalf of the system administrator to determine the validity of granting the resource access execution authority. Consequently, it becomes possible to automatically determine the validity of granting the resource access execution authority and perform authorization.

Figure 10:
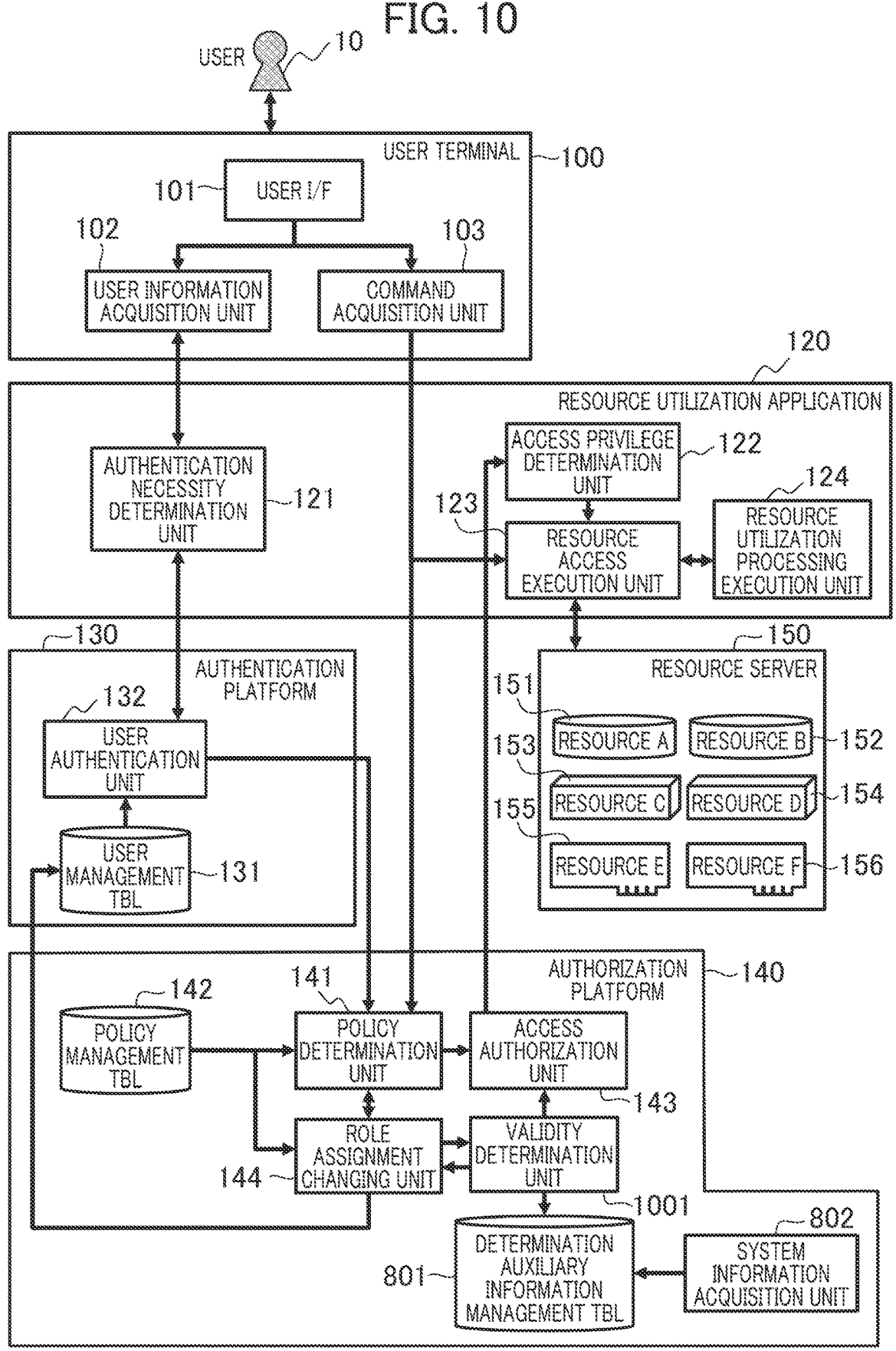
FIG. 10 typically shows a logic configuration example of a computer system according to a third embodiment of the present specification.

FIG. 10 is an example in which a validity determination unit 1001 is provided instead of the role management interface 145 of FIG. 8. In the configuration example of FIG. 10, when the role to which the execution authority of the resource access command requested by the user is granted is not assigned to the user in the policy determination unit 141, the role assignment changing unit 144 acquires the role to which the execution authority of the resource access command is granted from the policy management table 142, and transmits the same to the validity determination unit 1001 together with the resource access request acquired via the policy determination unit 141 and the information of the user who requested the resource access.

The validity determination unit 1001 determines whether or not to grant the authority to the user who requested the resource access and the target resource of the requested resource access command, based on the information in the determination auxiliary information management table 801. The validity determination unit 1001 collates the determination conditions 815 shown in FIG. 9, and automatically permits the granting of authority when all the essential determination conditions among the respective determination conditions are satisfied. Which conditions are made essential is determined in advance. In this embodiment, the interactive work of determining the granting of authority by the system administrator 20 becomes unnecessary.

Incidentally, the validity determination unit 1001 determines the validity, based on the determination auxiliary information. Only when it is determined that there is no validity, the validity determination unit 1001 automatically determines the disapproval. When it is determined that there is validity, it is also possible to request the system administrator 20 to determine whether or not to grant the authority. In that case, the system administrator 20 may perform the authorization determination only for the resource access request that the validity determination unit 1001 determines to be valid.

In the configuration examples of the first to third embodiments, the determination of the validity of the execution authority granting, and the authorization are performed on the resource access alone requested by the user. In a configuration example described below, the requested resource access and the resource access that may be executed consecutively are grouped in a series of operations. Further, for one or a plurality of other resource accesses included in the same group as the requested resource access, the validity of the execution authority granting is determined at the same time. When it is determined that there is validity, the permission is granted.

Figure 11:
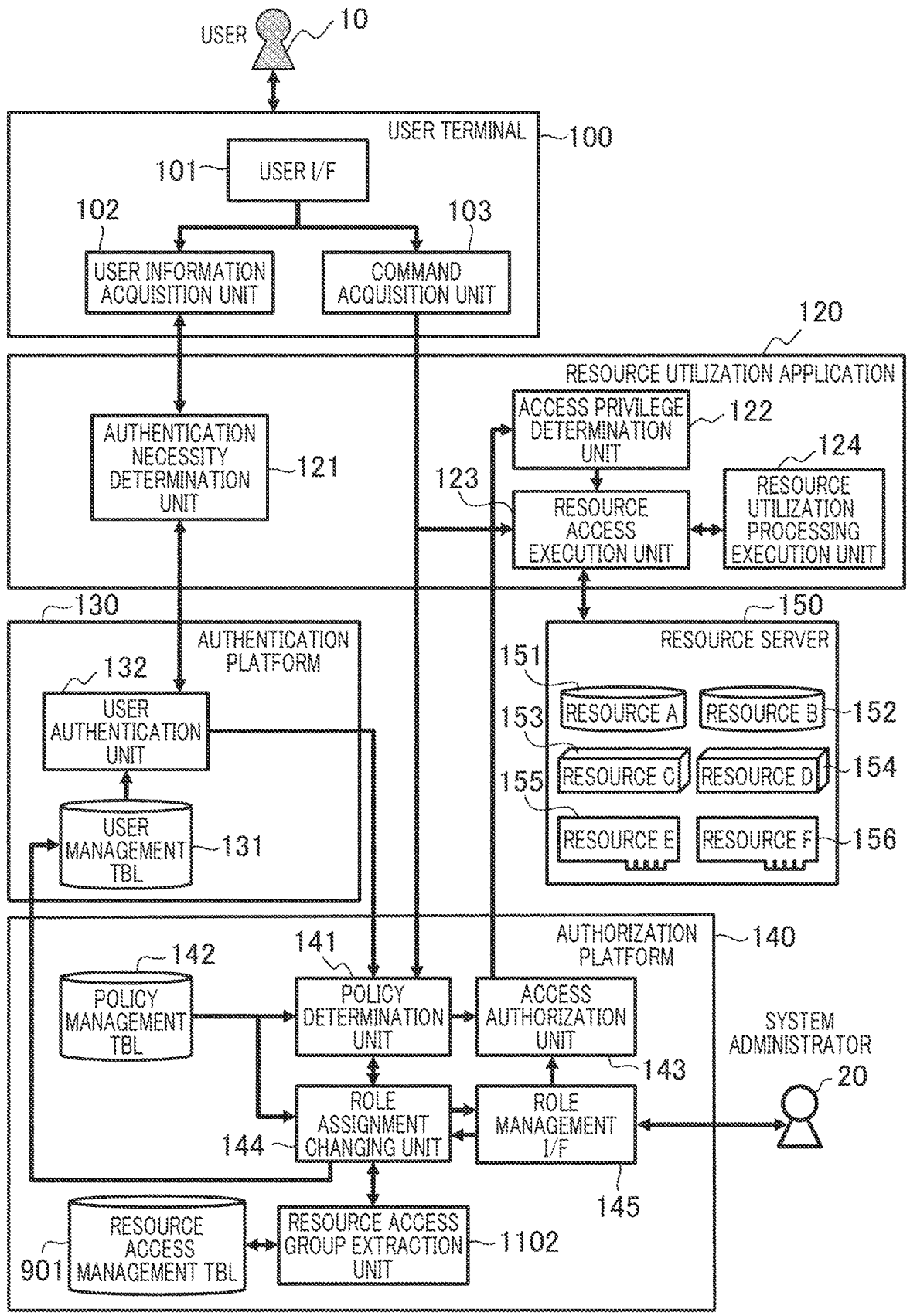
FIG. 11 typically shows a logic configuration example of a computer system according to a fourth embodiment of the present specification.

FIG. 11 is an example in which a resource access management table 901 and a resource access group extraction unit 1102 are further provided in the configuration of FIG. 2. The resource access management table 901 is a table in which resource access commands that may be continuously executed in a series of operations are registered as a group.

In one embodiment of the present specification, when a resource access is requested, the resource access group extraction unit 1102 acquires a resource access command belonging to the same group as the resource access command by collation with the resource access management table 901. The resource access group extraction unit 1102 presents information of an incidental resource access command belonging to the same group to the system administrator 20 via the role management interface 145 together with the information of the requested resource access command.

Thus, the system administrator 20 can simultaneously determine whether or not to grant execution authority even for the resource access command that may be continuously executed in a series of operations in addition to the requested resource access command. If the execution authorities of resource access commands that may be executed continuously are collectively authorized, it is not necessary to determine the granting of execution authority for each resource command that the user continuously requests in a series of work. Therefore, the efficiency of its determination is improved.

Figure 12:
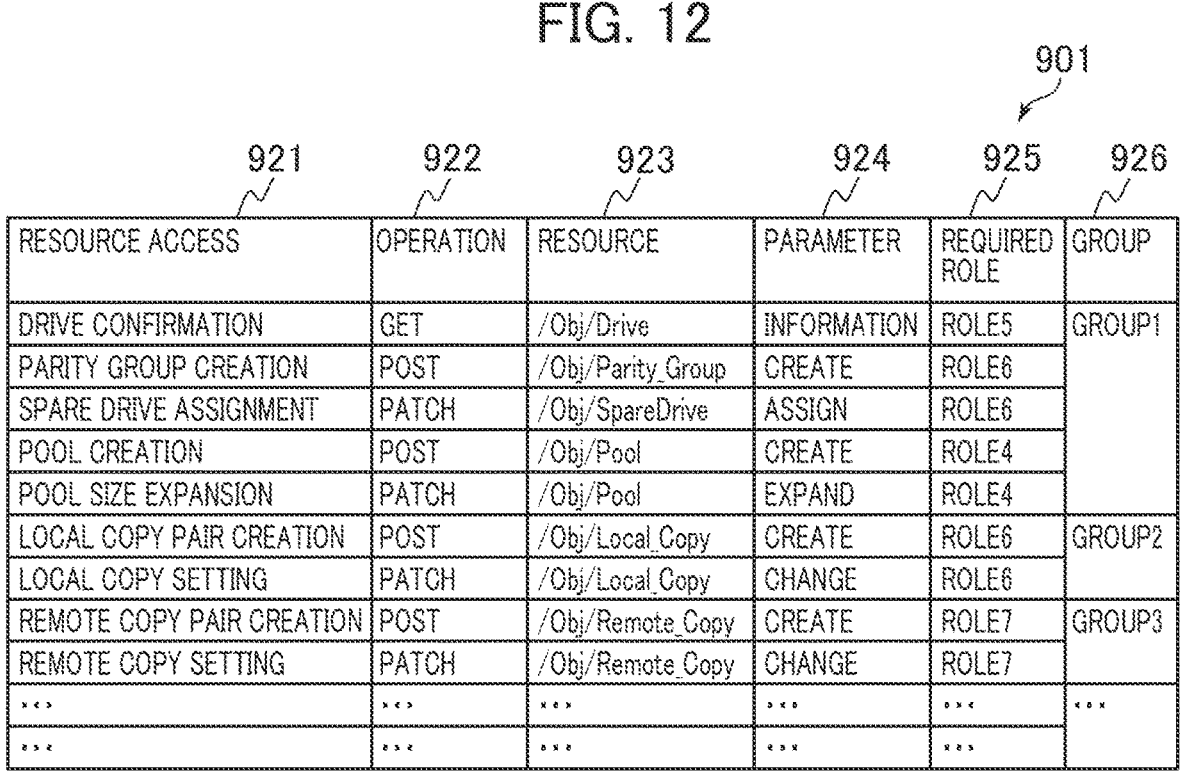
FIG. 12 shows an example of a role management table.

FIG. 12 is an example of the resource access management table 901. The resource access management table 901 shows a resource access 921, an operation 922, an object resource 923, a parameter 924, a required role 925, and a resource access group 926. The resource access command is identified by a combination of the operation 922 and the resource 923.

In FIG. 12, for example, in the resource access 921 in the storage system, drive confirmation, parity group creation, spare drive assignment, pool creation, and pool size expansion are likely to be highly executed as a series of operations. Therefore, it is assumed that the resource access commands belong to the same group (Group1).

Similarly, it is assumed that local copy pair creation and local copy settings belong to Group2, and remote copy pair creation and remote copy settings belong to Group3, and so on. Thus, for example, when the user requests the execution of a pool creation command, it becomes possible to determine together the granting of the execution authority of other resource access commands belonging to Group 1 as well, and to authorize them at the same time as necessary.

The resource access group extraction unit 1102 may extract the information of all columns 921 to 926 of the resource access management table 901 as the information to be presented to the system administrator 20, and extract the information of only some columns. The type of information to be presented is set in advance.

The resource access group extraction unit 1102 may present the information on all other resource access commands in the requested resource access command group, or may select some resource access commands and present the information thereof. For example, the resource access group extraction unit 1102 refers to the information of a user's role and extracts the resource access command in which the request origin user does not have the required role 925 from the requested resource access command group. The role management interface 145 presents the information of the extracted resource access command to the system administrator 20.

The system administrator 20 may make an execution authority grant determination for all of additionally presented incidental resource access commands other than the requested resource access command, and may make an execution authority grant determination for only a part of them. The system administrator 20 may determine whether or not to grant execution authority to each of the additionally presented resource access commands, or may collectively determine whether or not to permit all of the additionally presented resource access commands. The batch determination allows or disallows (prohibits) all resource access commands.

In the third embodiment, the validity determination unit 1001 determines whether or not to grant the execution authority of the requested resource access command in place of the system administrator 20. In this embodiment, the validity determination unit 1001 may be used. As described in the third embodiment, the determination auxiliary information management table 801 is implemented on the authorization platform 140 together with the validity determination unit 1001.

The validity determination unit 1001 acquires information on the incidental resource access command of the requested resource access command group and the required role from the resource access group extraction unit 1102. The validity determination unit 1001 compares the required role with the role information of the user information, and selects an incidental resource access command for which the user does not have the required role. The validity determination unit 1001 executes a permission/disapproval determination for granting execution authority based on the determination auxiliary information for each of the selected incidental resource access commands, as described in the third embodiment.

The validity determination unit 1001 may determine whether or not to grant the execution authority to each of the additionally presented resource access commands, or may collectively determine whether or not to permit all of the additionally presented resource access commands.

Incidentally, the present invention is not limited to the above-mentioned embodiments and includes various modifications. For example, the above-described embodiments have been described in detail in order to explain the present invention in an easy-to-understand manner, and are not necessarily limited to those having all the described configurations. Also, it is possible to replace a part of one configuration of the embodiment with the configuration of another embodiment. Further, it is also possible to add the configuration of another embodiment to the configuration of one embodiment. In addition, it is possible to apply addition/deletion/replacement of another configuration with respect to a part of the configuration of each embodiment.

Further, in regard to the above-described respective configurations, functions, processing parts, etc., some or all thereof may be realized in hardware, for example, by being designed with integrated circuits, and the like. In addition, the above-described respective configurations and functions, etc. may be realized in software by allowing a processor to interpret and execute a program realizing each function. Information about a program, a table, a file, etc. that realize each function can be put in a memory, a recording device such as a hard disk, an SSD (Solid State Drive) or the like, or a recording medium such as an IC card, an SD card or the like.

In addition, control lines and information lines indicate what is considered necessary for explanation, but do not necessarily indicate all controls lines and information lines on the product. In practice, it may be considered that almost all configurations are interconnected.

What is claimed is:

1. An access control system which controls user access to a resource, comprising:
   at least one processor; and
   at least one storage device which stores information defining conditions under which each user is allowed to perform resource access,
   wherein the at least one processor acquires a first access request indicating an operation for a first resource in a target system by a first user,
   determines based on the information whether or not the first access request is permitted,
   acquires a result of an additional permission/disapproval determination of the first access request in response to the disapproval determination of the first access request, and
   grants execution authority of the first access request by the first user according to the result of the additional permission/disapproval determination indicating permission.

2. The access control system according to claim 1, wherein the at least one processor presents to an administrator a request for the additional permission/disapproval determination of the first access request in response to the disapproval determination of the first access request, and
   receives the result of the additional permission/disapproval determination from the administrator.

3. The access control system according to claim 2, wherein the at least one processor presents the administrator with information on at least one of a state of the target system and a state of the first user, together with the request for the additional permission/disapproval determination.

4. The access control system according to claim 2,
   wherein the at least one storage device stores auxiliary information,
   wherein the auxiliary information includes: at least one information of a state of the target system and a state of one or more users including the first user; and information of a criterion for the additional permission/disapproval determination, and
   wherein at least one processor presents the administrator with at least one information which meets the criterion for the additional permission/disapproval determination.

5. The access control system according to claim 1,
   wherein the at least one storage device stores auxiliary information,
   wherein the auxiliary information includes: at least one information of a state of the target system and a state of one or more users including the first user; and information of a criterion for the additional permission/disapproval determination, and
   wherein the at least one processor executes the additional permission/disapproval determination of the first access request, based on the auxiliary information.

6. The access control system according to claim 2,
   wherein the at least one storage device stores resource access management information which defines one or more resource access groups, and
   wherein the at least one processor acquires information on incidental resource access included in the same resource access group as the first access request from the resource access management information,
   presents the information on the incidental resource access to the administrator, and
   acquires a determination result of permission/disapproval of the incidental resource access from the administrator.

7. The access control system according to claim 4,
   wherein the at least one storage device stores resource access management information which defines one or more resource access groups, and
   wherein the at least one processor acquires information on incidental resource access included in the same resource access group as the first access request from the resource access management information, and
   executes the permission/disapproval determination of the incidental resource access, based on the auxiliary information.

8. An access control method which controls user access to a resource, comprising the steps of:
- causing a system to acquire a first access request indicating an operation for a first resource in a target system by a first user,
- causing the system to determine whether or not the first access request is permitted on the basis of information defining conditions under which each user is allowed to perform resource access,
- causing the system to acquire a result of an additional permission/disapproval determination of the first access request in response to the disapproval determination of the first access request, and
- causing the system to grant execution authority of the first access request by the first user according to the result of the additional permission/disapproval determination indicating permission.

9. The access control method according to claim 8, wherein the system presents to the administrator a request for the additional permission/disapproval determination of the first access request in response to the disapproval determination of the first access request, and
wherein the system receives the result of the additional permission/disapproval determination from the administrator.

10. The access control method according to claim 9, wherein the system presents information on at least one of a state of the target system and a state of the first user to the administrator together with the request for the additional permission/disapproval determination.

11. The access control method according to claim 9, wherein the system refers to the auxiliary information, and the auxiliary information includes: information on at least one of the state of the target system and the state of one or more users including the first user; and information on the criterion for the additional permission/disapproval determination, and
wherein the system presents to the administrator the at least one information which satisfies the criterion for the additional permission/disapproval determination.

12. The access control method according to claim 8, wherein the system refers to auxiliary information, and the auxiliary information includes: information on at least one of the state of the target system and the state of one or more users including the first user; and information on the criterion for the additional permission/disapproval determination, and
wherein the system executes an additional permission/disapproval determination of the first access request, based on the auxiliary information.

13. The access control method according to claim 9, wherein the system acquires information on incidental resource access included in the same resource access group as the first access request from the resource access management information which defines one or more resource access groups,
wherein the system presents information on the incidental resource access to the administrator, and
wherein the system acquires the determination result of permission/disapproval of the incidental resource access from the administrator.

14. The access control method according to claim 11, wherein the system acquires information on incidental resource access included in the same resource access group as the first access request from the resource access management information which defines one or more resource access groups, and
wherein the system executes the permission/disapproval determination of the incidental resource access based on the auxiliary information.

* * * * *